United States Patent
Velasco

(10) Patent No.: US 12,082,599 B2
(45) Date of Patent: *Sep. 10, 2024

(54) PROCESS FOR PREPARING A FROZEN COCONUT PRODUCT AND FROZEN COCONUT PRODUCT PREPARED THEREBY

(71) Applicant: Alvin Velasco, Miami Shores, FL (US)

(72) Inventor: Alvin Velasco, Miami Shores, FL (US)

(*) Notice: Subject to any disclaimer, the term of this patent is extended or adjusted under 35 U.S.C. 154(b) by 40 days.

This patent is subject to a terminal disclaimer.

(21) Appl. No.: 17/317,777

(22) Filed: May 11, 2021

(65) Prior Publication Data

US 2021/0337843 A1  Nov. 4, 2021

Related U.S. Application Data

(63) Continuation of application No. 14/592,846, filed on Jan. 8, 2015, now Pat. No. 11,000,054, which is a continuation-in-part of application No. 13/799,658, filed on Mar. 13, 2013, now abandoned.

(60) Provisional application No. 61/663,523, filed on Sep. 6, 2012.

(51) Int. Cl.
| | |
|---|---|
| A23L 19/00 | (2016.01) |
| A23B 7/04 | (2006.01) |
| A23L 5/30 | (2016.01) |
| A23L 25/00 | (2016.01) |

(52) U.S. Cl.
CPC ............ *A23L 19/00* (2016.08); *A23B 7/0433* (2013.01); *A23L 5/30* (2016.08); *A23L 19/03* (2016.08); *A23L 25/00* (2016.08); *A23V 2002/00* (2013.01)

(58) Field of Classification Search
None
See application file for complete search history.

(56) References Cited

U.S. PATENT DOCUMENTS

| | | |
|---|---|---|
| 3,277,657 A | 10/1966 | Harper |
| 4,140,807 A | 2/1979 | Braverman |
| 11,000,054 B2 | 5/2021 | Velasco |
| 2004/0071846 A1 | 4/2004 | de la Mora |
| 2005/0112252 A1 | 5/2005 | Tewari |
| 2005/0163906 A1 | 7/2005 | Silva |
| 2007/0012068 A1 | 1/2007 | Kaplan |
| 2008/0245078 A1 | 10/2008 | Burn |
| 2013/0183420 A1 | 7/2013 | Shimek |
| 2015/0118371 A1 | 4/2015 | Velasco |

OTHER PUBLICATIONS

FlashFreeze.net: The history of flash freezing; published online at least by Oct. 27, 2020 at: https://web.archive.org/web/20201027000906/ https://flash-freeze.net/flash-freezing/the-history-of-blast-freezers. html (Year: 2020).*

(Continued)

*Primary Examiner* — Patricia A George
(74) *Attorney, Agent, or Firm* — Fleit Intellectual Property Law; Paul D. Bianco; Katharine Davis

(57) ABSTRACT

A process for producing frozen untapped young coconut water inside its carved young tender meat. The packaged frozen young untapped coconut water inside its very own carved young tender coconut meat comprises two freezing steps wherein the prepackaged product is frozen before packaging and sealing in a packaging cup and frozen again in a standard freezer.

8 Claims, 2 Drawing Sheets

(56) References Cited

OTHER PUBLICATIONS

Quinene: Deliciously Coconut : How to Remove the Green Shell From a Coconut; published online Oct. 31, 2011 at: https://www.youtube.com/watch?v=gdLi8dhR3Y8 (Year: 2011).*

Tas Thai Agricultural Standard TAS 15-2007; Aromatic Coconut; National Bureau of Agricultural Commodity and Food Standards, Ministry of Agriculture and Cooperatives, published Royal Gazette, vol. 123, Section 3D, dated Jan. 4, 2008.

Kalmia: http://www.cookingjunkies.com/rec-food-cooking/raw-coconut-maet-storage-59230html; Bulletin, Thread: raw coconut meat storage, Jun. 23, 2012.

Sunshine and Dance: Thai Cooking with Sunshine; http://sunshine-dineanddance.blogspot.com/2010_08_01archive.htmlpublished Aug. 2010.

Schmutz Clemson Cooperative Extension: Freezing Fruits and Vegetables; HGIC 3036; publication Jul. 1999; revised May 2011.

The Cultured Cook, DIY Coconut Water, published online Aug. 13, 2012.

Avure Technologies: High Pressure Food Processing , HPP Food Safety Systems; published online Dec. 18, 2008.

Jeremy Safron; Coconut Benefits, http://web.archive.org/web/20021014125415/http://www.youngcoconuts.com/benefits.html—published online Oct. 2002.

Rahman; Handbook of Food Preservation; by Taylor & Francis Group LLC., 2007 1088 pgs.

Lacers 2007—Extracting Coconut Ball Using a Water Buffalo Horn—http://www.youtube.com/watch; published online Jan. 13, 2011.

The Coconut Hub; http://www.coconuttinformayion.com/cocos; Oct. 17, 2018.

India Together: from Snow Ball to Coconut Lassi; published Jan. 22, 2009 at http://www.indiatogether.org/tendcoco-economy—2009.

Patrick Dempsey; The Art of Air Blast Freezing: Design and Efficiency Considerations; Applied Thermal Engineering 41 (2012) 71-83—online Dec. 13, 2011.

V. Waisundara et al., Effect of Different PreTreatments of Fresh Coconut Kernels on Some of the Quality Attributes of the coconut water Extracted; Science Direct Food Chemistry 101 (2007) 771-777.

K. Considine et al., High-Pressure Processing—Effects on Microbial Food Safety and Food Quality; published online Feb. 16, 2008.

Lillian Downey; How to Freeze Fresh Raw Coconut; http://www.oureverydaylife.com/freeze-freash-raw-coconut-37300html—online Jan. 4, 2021.

* cited by examiner

PROCESS FOR PREPARING A FROZEN COCONUT PRODUCT AND FROZEN COCONUT PRODUCT PREPARED THEREBY

CROSS REFERENCE TO RELATED APPLICATIONS

This application is a continuation in part (CIP) and claims priority from U.S. patent application Ser. No. 13/799,658, entitled "Method for production of frozen untapped young coconut water inside its carved tender coconut meat", filed on Mar. 13, 2013. The benefit under 35 USC § 119(e) of the United States provisional application is hereby claimed, and the aforementioned application is hereby incorporated herein by reference.

U.S. patent application Ser. No. 13/799,658 claims priority from U.S. patent application Ser. No. 61/663,523, entitled "Method for production of frozen untapped young coconut water inside its carved tender coconut meat", filed on Jun. 22, 2012. The benefit under 35 USC § 119(e) of the United States provisional application is hereby claimed, and the aforementioned application is hereby incorporated herein by reference.

TECHNICAL FIELD OF THE INVENTION

This application generally relates to a method for producing frozen untapped young coconut water inside its carved young tender coconut meat and the resultant product.

BACKGROUND OF THE INVENTION

Many commercial food products require fresh or fresh-like products for use in producing such products; the preparation consists of a process wherein the product is frozen at a suitable temperature, packaged and sealed. Frozen food products are very desirable to the consumer since they can be stored for long periods of time in a frozen state.

In addition, when the consumer eats a frozen product, upon thawing, it is desired to have a method of preservation that has taste characteristics similar to a fresh product, without preservatives but which can be stored for extended periods of time. It is further known that products can be flash frozen or referred to as blast freezing in an attempt to preserve or improve that is close enough to a fresh-like product by optimizing method for freezing a product by mechanical freezing.

Young coconut liquid endosperm or young coconut water is known to either canned with coconut jelly tidbits and polycoated drink-boxed both of which are preserved in room temperature or frozen in polypropylene (PP) or Polyethylene terephthalate (PET) plastic containers, for consumption by consumers. Additionally, young coconut solid endosperm or young tender coconut meat sometimes referred to as young coconut flesh or simply coconut jelly is usually available grated in PP or PET plastic, vacuum-packed and frozen. While these current methods are well suited to preserve young coconut water and young coconut meat there is no current method to produce frozen untapped young coconut water enclosed and intact inside its own carved young and tender coconut meat.

The popularity of young coconut water has led to a desire to produce frozen young coconut water, untapped, untouched and preserved intact on its own confined core by sculpting the coconut jelly. In view of the foregoing, this desire has not been attained, to date, because a naturally young coconut liquid endosperm frozen inside its own natural solid endosperm has not been offered to consumers without the separation of the two constituent parts that complement each other. When you set aside and preserve the coconut liquid endosperm from the coconut solid endosperm, the flavor of the end product can be lessened in fullness by the presence of artificial preservatives and stabilizers. The product can have an artificial or off flavor not like that of the natural young coconut.

For these reasons, it is desired to have a method for producing frozen young coconut water, that when thawed, has the taste of fresh-like characteristics.

Definitions

"Blast Freezing" is a preservation method that impede microbial growth include refrigeration and freezing, hence, right after washing and rinsing the sculpted coconut meat the product is pasteurized by blanching the surface of the meat under mild heat treatment, and then preservation such as blast freezing by individually quick freezing (IQF) for product stability during storage and distribution.

The term "tender" though a relative term pertains to the young coconut meat's age or time frame of "maturity" for harvesting between the 9th and 10th month or between the 40th week to the 43rd week after fruits emerge. Coconut meat harvested at this time is fully formed and for this purpose still soft in order to be carved out of the shell using a carving/sculpting tool derived from the alpha-keratin buffalo horn, thinned, sharpened and pliable. Carving tools with similar properties can also be used. As a result, any time before this timeframe is not possible to carve coconut meat from the shell because before the 9th month or the 40th week, the coconut meat/solid endosperm is certainly too thin and without doubt too soft for the purpose of sculpting

SUMMARY OF THE INVENTION

The process relates to a method for producing frozen untapped young coconut water contained inside the carefully and precisely carved young tender coconut flesh, that upon thawing, have retained its natural taste characteristics similar to fresh product. Blast freezing is the most preferred method of preservation. The blast freezing method oftentimes called flash or quick freezing includes the step of quick freezing the selected young tender carved coconut meat with the coconut water intact after removal from the coconut husk and shell.

In one aspect, the method for producing frozen untapped young coconut water encased inside the precisely carved young tender coconut meat is initiated by obtaining properly selected green raw young coconuts. The fleshy white, soft endosperm is then separated from the coconut's outer layer exocarp and middle layer mesocarp or husk and endocarp, the shell. In particular, the coconut husk and shell are dissociated to collect the tender, gelatinous coconut meat encapsulating the coconut water.

In another aspect, the product is mechanically frozen. The freezing steps can be accomplished using a blast freezer and a standard freezer. As such, any of a variety of methods can be used to freeze the coconut water. Preferably, the initial freezing step is blast freezing. The packaging step can be done before or after freezing. Preferably, the product is packaged after freezing. The packaged frozen product is then stored in standard mechanical freezer.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
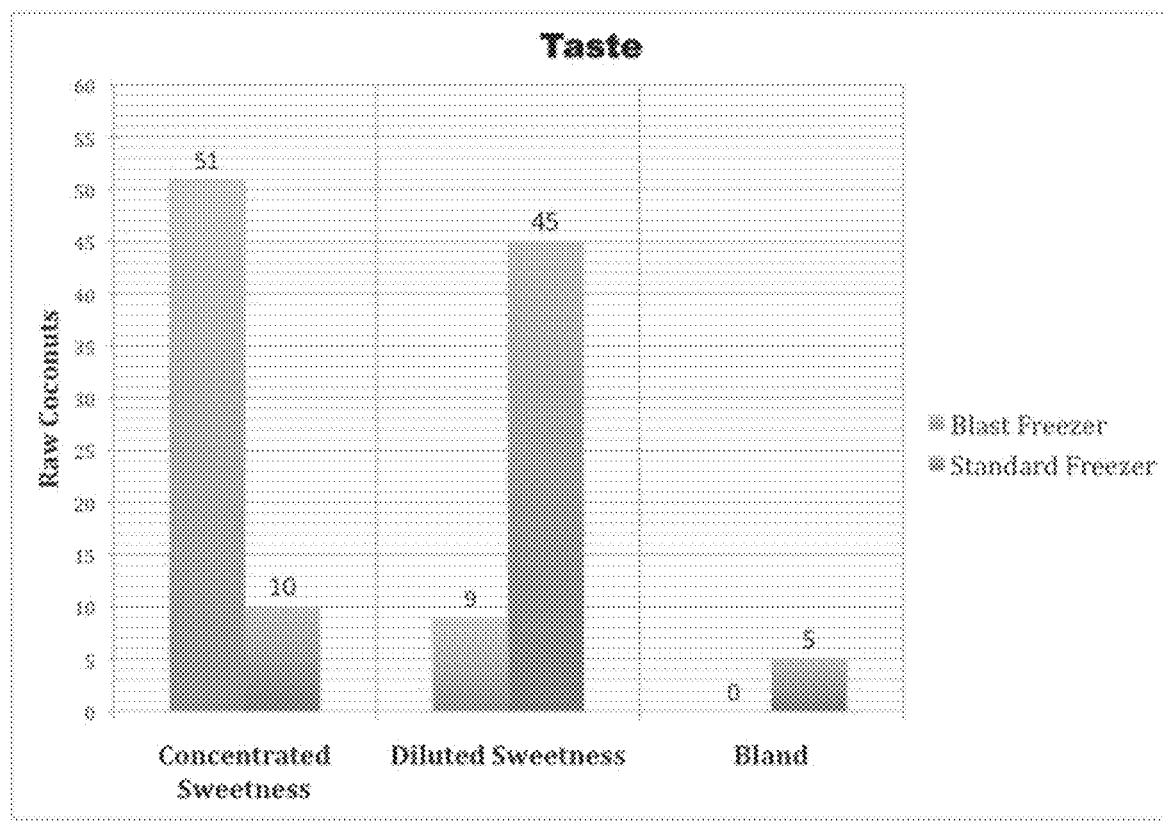
FIG. 1 shows taste distinctions of 60 carved raw young coconuts using a blast freezer and 60 carved raw young coconuts using a standard freezer in terms of sweetness of young coconut water or liquid endosperm after allowing defrosting at ambient temperature. The blast frozen coconuts had more concentrated sweetness than the regular standard freezer.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The present process relates to a method for producing unique frozen untapped young coconut water encased in its own carved tender young coconut meat. The method includes the steps of breaking up the three outer layers of the coconut: exocarp, mesocarp, and endocarp to obtain the solid endosperm containing the liquid endosperm.

The method includes the steps of flash freezing, packaging and storing in standard freezer. The resultant frozen coconut will have preferred natural taste characteristics when thawed. Additionally, the present method relates to the resultant frozen coconut product.

Any of a variety of coconuts can be used with the present method. The coconut meat (endosperm) starts to form at about the 6th month after flowering. The coconut meat is completely formed between the 9th and 10th month but the shell does not fully hardened until the 12th month when it is fully ripened and fully matured. At the 9th-10th month the endosperm in a green young coconut is softer and more gelatinous ready for harvest than that in a mature coconut— in such a manner that it is sometimes referred as coconut jelly or young coconut flesh. The young coconuts should all be fresh and immature by the 10th month in order to ensure a carefully and precisely carved endosperm and to have a more desirable end-product taste and texture characteristics.

The term "tender" though a relative term pertains to the young coconut meat's age or time frame of "maturity" for harvesting between the $9^{th}$ and $10^{th}$ month or between the $40^{th}$ week to the $43^{rd}$ week after fruits emerge. Coconut meat harvested at this time is fully formed and for this purpose still soft in order to be carved out of the shell using a carving/sculpting tool derived from the alpha-keratin buffalo horn, thinned, sharpened and pliable. Carving tools with similar properties can also be used.

As a result, any time before this timeframe is not possible to carve coconut meat from the shell because before the $9^{th}$ month or the $40^{th}$ week, the coconut meat/solid endosperm is certainly too thin and without doubt too soft for the purpose of sculpting out of the shell, consequently spilling the coconut water in the process.

On the other hand, after the $10^{th}$ month or the $43^{rd}$ week, the coconut meat has hardened accordingly. Thus, it is by all means not possible to carve out the coconut meat from the shell using the flexible and thinned carving tool.

To more clearly define the operation and procedure of this method, the following description is provided. The process is preferably initiated by removing the first two layers of the coconut, the outer layer exocarp and the middle layer fiber mesocarp also called coir make up the husk. The immature, not fully hardened shell endocarp will be exposed once the exocarp and mesocarp are removed. The white soft coconut meat or endosperm protected by the shell or endocarp is carved out of the immature shell by creating about 2 cm circumferential opening from the endocarp to expose the endosperm using commercially pliable alpha keratins. Once the tender young coconut endosperm containing the intact coconut water is obtained, it is thoroughly washed using cold running water. Such a step will preferably remove impurities such as remnants of mesocarp and endocarp.

After fully rinsing in cold running water and then blanching the surface of the exposed white, tender, gelatinous coconut flesh, the pre-frozen product is gently packed into the perforated blast freezing tray loosely to slide the tray into the blast freezer toward the cold air outlet fans. The blast freezer door will then be closed and secured. The next step is to set the controls on the blast freezing unit to –35 degrees Celsius (–31 degrees Fahrenheit). The internal fan will then be turned on to medium speed, approximately 10 feet per second or 3 meters per second. Attaining –22 degrees Celsius (–7.6 degrees Fahrenheit) within 25 minutes, the frozen coconut will then be removed and sealed in a packaging container cup and place into a mechanical cold storage that maintains temperature ranging from about –25 degrees Celsius (–13 degrees Fahrenheit) to about –20 degrees Celsius (–4 degree Fahrenheit).

The freezing steps of the product involve mechanical freezing: blast freezer and standard freezer. It is most preferred on the initial step, however, to blast freeze, the young tender coconut endosperm containing the coconut water. Blast freezing or flash freezing will involve exposing the solid endosperm-enclosing coconut water to temperatures equal to approximately –35 degrees Celsius (in refrigerant R-404A) for about 25 minutes.

For mechanical blast freezing, refrigerant R-404A may be used. Blast freezers may be purchased from any of a variety of commercial providers. Flash freezing is crucial to the present process because it produces a fresh product. It is believed that blast freezing prevents coconut water in the endosperm and the endosperm itself of the coconut from expanding called crystallization and thereby breaking the cell wall. Any method that maintains the cell wall during freezing may be used.

The resultant blast frozen young coconut water contained in the endosperm of the coconut will have outstanding taste characteristics, will have a texture, in particular, when thawed, similar to a fresh product.

After being initially blast frozen, the product is inserted into a packaging container cup and sealed for storage. The sealed packaging container cup containing the frozen young coconut water enclosed on its own young tender coconut meat can be stored in a standard mechanical cold storage at a temperature ranging from about −25 degrees Celsius (−13 degrees Fahrenheit) to about −20 degrees Celsius (−4 degree Fahrenheit). The frozen product can then be stored for an extended period (e.g. about 26 to 39 weeks) prior to being thawed for consumption.

The product is allowed to thaw or temper for about 6 hours at ambient conditions. Thawing of the packaged frozen young coconut water surrounded by its very own young tender coconut meat is also conducted by placing the packaged product into a standard refrigerator for 12 hours where temperatures stay below 4.44 degrees Celsius (40 degrees Fahrenheit). Thawing or defrosting slowly is conducted in order to achieve a temperature and texture suitable for serving the food product to a consumer. For example, a frozen product may be consumed at a temperature ranging from 4.44 degrees Celsius (40 degrees Fahrenheit) or below although other temperatures may be suitable to effectively defrost.

After thawing, the food product may be held at refrigerated temperature for a desired period of time, for example, to accommodate food service holding of the food product. The defrosted young coconut water inside its own young tender coconut meat can be kept in a refrigerated temperature for a period of 14 days.

EXAMPLES

The process will now be described with reference to the following non limiting examples. These examples were conducted in order to determine sensory taste and texture differences between two mechanically static frozen samples during initial freezing utilizing a blast freezer on one batch and the resultant products using a standard freezer on the other.

Example 1

Sixty carved young tender coconut water-contained coconut meats were obtained. After inspection, the pre-frozen coconuts were washed, rinsed in cold running water and then blanched. The coconuts were placed on a tray and blast frozen. A blast freezing device manufactured by Coolaire Consolidated, Inc. was used. The coconuts were contacted and blast frozen having a temperature of −35 degrees Celsius (−31 degrees Fahrenheit) for 25 minutes. The blast frozen coconuts were then packaged and stored.

Example 2

Sixty young coconut water-contained in carved young tender coconut meats were obtained. After inspection, the pre-frozen coconuts were washed and rinsed in cold running water and then blanched afterward. The group was frozen with a mechanically slow freeze-static regular standard freezer at 17.78 degree Celsius (0 degree Fahrenheit). A General Electric upright freezer was used. The regularly standard frozen coconuts were then packaged and stored. Products were obtained and tested as follows:

A. Young Coconut Water-Contained Tender Coconut Meat-Carved-Static Freezer:
 1. Select 60 same ages' young coconuts,
 2. Carved-out of exocarp, mesocarp and endocarp,
 3. Wash, rinse and blanch,
 4. Tray up and freeze the coconut in −18 degrees Celsius (0 degrees Fahrenheit) static air for 5 hours, packaged and stored, and
 5. Thaw and taste for taste and texture comparison.

B. Young Coconut Water-Contained Tender Coconut Meat-Carved-Blast Freezer
 1. Select 60 same ages' young coconuts,
 2. Carved-out of exocarp, mesocarp and endocarp,
 3. Wash, rinse and blanch,
 4. Tray up and freeze the coconut in −35 degrees Celsius (−31 degrees Fahrenheit) circulating air for 25 minutes, packaged and stored, and
 5. Thaw and taste for taste and texture comparison.

Figure 2:
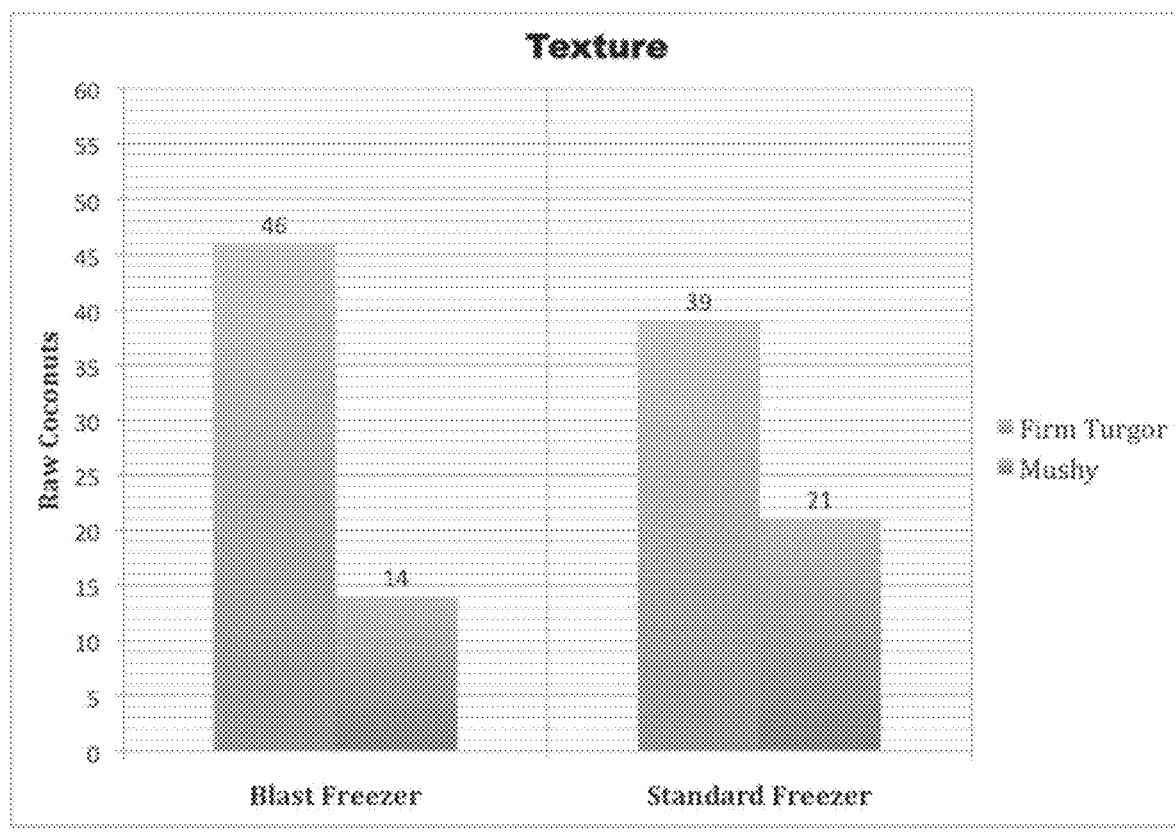
FIG. 2 shows texture distinctions of 60 carved raw young coconuts when using a blast freezer and 60 carved raw young coconuts when using a standard freezer in terms of how firm, turgid and how mushy or soft the young coconut meat or young coconut solid endosperm has become after allowing to defrost at ambient temperature. It was noticeable among the blast frozen coconuts which had a more turgid texture than the clammier and mushier texture from the slow-static freezer

The packaged frozen young coconut water encapsulated in its own coconut flesh or meats were allowed to defrost for 12 hours at ambient conditions. The following observations were made regarding the above products and are shown in FIGS. 1 and 2. The blast frozen coconuts had a more concentrated sweetness than the regular standard freezer resultant products (FIG. 1). In some embodiments, a clear texture distinction (FIG. 2) was noticeable among the blast frozen coconuts which had a more turgid texture than the clammier and mushier texture from the slow-static freezer. As can be seen the products frozen with blast freezer were superior.

The previous embodiments and examples included a method of pasteurization by blanching the coconut meat before packaging. In the next embodiments, a second round of pasteurization after each product is individually wrapped by way of High Pressure Processing (HPP) occurs.

In yet another embodiment of the present invention, the blanching and blast freezing steps are omitted and replaced by High Pressure Processing (HPP). In this embodiment, the process of mild heat treatment by blanching coconut meat after sculpting is omitted. The process of individually quick freezing (IQF) the product before packaging is omitted. Therefore, after sculpting from the shell the coconut meat is then washed, packaged, sealed, and in-package pasteurized by high pressure processing (HPP)-treated for 3 minutes. The HPP treated packaged product is then refrigerated between 2 degree C. to 4 degree C. (36 F to 39 F) under normal refrigerated conditions of storage and distribution with a shelf life of 120 days.

In another embodiment, the blanching process continues in addition to the IQF or blast freezing process. After the coconut meat is individually quick frozen, each product is then packaged, sealed, and in-package pasteurized by high pressure processing (HPP)-treated for 3 minutes. The HPP treated packaged product is then refrigerated between 2 degree C. to 4 degree C. (36 F to 39 F) under normal refrigerated conditions of storage and distribution with a shelf life of 120 days.

HPP operational pressures are at the level of 400-600 MPa and employed at ambient or mild temperatures in a single continuous treatment. For the HPP treatment, the vacuum-packed young coconut meat containing coconut water is deposed in carrier and either manually or automatically loaded into the High Pressure vessel.

The HPP pasteurization inactivates the vegetative enzymes, as well as any present pathogenic and spoilage microorganisms to achieve reduction of 5-log units for a short period of time from 3-5 minutes. This level of treatment retains the natural flavor and nutrients of the young coconut meat and water.

Enzyme and microbial inactivation and preservation of the young coconut water enclosed in young coconut meat by HPP application aim to prolong the shelf-life to 120 days in an undisturbed cooling chain.

In still another embodiment, the manual, labor intensive shucking and de-shelling of the young coconut using sharps (machete) and thinned, sharpened buffalo horn by removing the exocarp (outer layer), mesocarp (white husk) and the full or partial endocarp (coconut shell) to obtain the young coconut meat enclosing the water is replaced by a mechanized and simplified version for commercial process optimization using HPP. HPP shucking reduces the need for manual shucking.

The exocarp and mesocarp are still manually machete-removed, and then the exposed full or partial endocarp (young coconut shell) containing the young coconut meat and water is manually arranged or deposed in carrier and either manually or automatically loaded into the High Pressure vessel for shucking at pressures between 250-500 MPa for 2 to 5 minutes at temperatures between 1 and 35 Celsius.

This method utilizes high pressure processing by exposing the dehusked coconut, preferably young green coconut between the 9th and 10th month or from the 40th week to the 43rd week, applying pressure to the coconut shell in the range of 10,000 psi to about 100,000 psi, preferably 80,000 psi, to effectively detach from the testa lining the outer part of the coconut meat (solid endosperm) that separate from the inner part of the coconut shell (full or partial endocarp), for a time period of about 1 to about 20 minutes, preferably about 3 minutes at a temperature in the range of refrigerated to ambient temperatures of 0 degree Celsius to room temperature of up to 25 degree Celsius. After high pressure processing, the coconut shell can be removed using any available means to provide de-shelled coconut meat with coconut water intact.

After HPP treatment, the shell of the young coconut can then be either easily manually or semi-automatically de-shelled using a high-speed industrial cut-off tool, completely recovering the young coconut meat with water intact from the shell, thereby increasing the processing efficiency and product yield. After complete extraction, the coconut meat containing water will either be vacuum packed or packaged in a container and refrigerated between 2 to 4 degrees Celsius.

In another embodiment of the present invention, PUV or Pulsed UltraViolet sterilization, an alternative to the previously discussed form of sterilization is utilized, as the FDA has endorsed UV for food pasteurization.

In this embodiment, the method of the present invention teaches using a PUV sterilization system to achieve 5-log reduction. The partially de-shelled/partially husked/semi-husked or fully de-shelled coconut meat-containing coconut water, refrigerated or ambient temperature, unpacked or polypropelene/nylon/polyetylene(PP/NY/PET) vacuum-packed is manually passed or fed to a conveyor individually where a fully automated pulsed UV dose is applied, 1 to 20 by pulse bursts, with selected pulsed energy of 100-500 J, pulse repetition rates of 1 to 5 Hz, preferably 3 Hz to achieve a 5-log reduction.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

What is claimed is:

1. A process for preparing a frozen coconut product in which coconut liquid endosperm is frozen within a coconut solid endosperm, the process including steps, the steps consisting of:
   obtaining at least one raw young coconut at about 9 months to about 10 months in age;
   removing an outer exocarp layer and a middle mesocarp layer from the at least one raw young coconut to expose a shell endocarp layer of the at least one raw young coconut, the shell endocarp layer enclosing the coconut solid endosperm;
   carving the coconut solid endosperm from the shell endocarp layer of the at least one raw young coconut, the coconut liquid endosperm within the coconut solid endosperm;
   washing the coconut solid endosperm;
   pasteurizing the coconut solid endosperm;
   blast freezing the coconut solid endosperm such that the coconut liquid endosperm freezes within the coconut solid endosperm to form the frozen coconut product;
   packaging and sealing the frozen coconut product; and
   cold storing the frozen coconut product.

2. The process for preparing a frozen coconut product according to claim 1, wherein the obtaining of the at least one raw young coconut includes obtaining the at least one raw young coconut from a palm tree between a $40^{th}$ week and a $43^{rd}$ week after fruits emerged on the palm tree.

3. The process for preparing a frozen coconut product according to claim 1, wherein the carving of the coconut solid endosperm from the shell endocarp layer of the at least one raw young coconut is carried out using an alpha-keratin buffalo horn.

4. The process for preparing a frozen coconut product according to claim 1, wherein the washing of the coconut solid endosperm includes rinsing the coconut solid endosperm in running water.

5. The process for preparing a frozen coconut product according to claim 1, wherein the pasteurizing of the coconut solid endosperm includes blanching a surface of the coconut solid endosperm.

6. The process for preparing a frozen coconut product according to claim 1, wherein the blast freezing of the coconut solid endosperm includes:
   placing the coconut solid endosperm in a perforated blast freezing tray in a blast freezer;
   securing a door of the blast freezer;
   setting temperature at about −35° C.;
   activating an internal fan in the blast freezer at a speed of about 3 meters per second; and
   freezing the coconut solid endosperm for about 25 minutes.

7. The process for preparing a frozen coconut product according to claim 1, wherein the cold storing of the frozen coconut product includes maintaining a frozen state of the frozen coconut product by placing the frozen coconut product in a mechanical freezer at a temperature ranging from about −25° C. to about −20° C.

8. The process for preparing a frozen coconut product according to claim 6, wherein the blast freezing of the coconut solid endosperm includes bringing a temperature of the coconut solid endosperm to −22° C. in about 25 minutes.

* * * * *